(12) United States Patent
Yamamoto et al.

(10) Patent No.: US 10,946,921 B2
(45) Date of Patent: Mar. 16, 2021

(54) SADDLE RIDING VEHICLE

(71) Applicant: HONDA MOTOR CO., LTD., Tokyo (JP)

(72) Inventors: Chiaki Yamamoto, Wako (JP); Hideaki Haraguchi, Wako (JP); Nobuyuki Kurogi, Wako (JP); Shinobu Miyagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 237 days.

(21) Appl. No.: 16/185,460

(22) Filed: Nov. 9, 2018

(65) Prior Publication Data

US 2019/0152552 A1  May 23, 2019

(30) Foreign Application Priority Data

Nov. 21, 2017 (JP) ................. 2017-223594

(51) Int. Cl.
| | |
|---|---|
| *B62J 99/00* | (2020.01) |
| *B62J 1/08* | (2006.01) |
| *B62J 15/00* | (2006.01) |
| *B62K 25/28* | (2006.01) |
| *B62K 11/04* | (2006.01) |
| *B62M 7/04* | (2006.01) |
| *B62J 43/00* | (2020.01) |
| *B62J 45/20* | (2020.01) |

(52) U.S. Cl.
CPC ................ *B62J 99/00* (2013.01); *B62J 1/08* (2013.01); *B62J 15/00* (2013.01); *B62K 11/04* (2013.01); *B62K 25/283* (2013.01); *B62M 7/04* (2013.01); *B62J 43/00* (2020.02); *B62J 45/20* (2020.02)

(58) Field of Classification Search
CPC ........... B62J 43/00; B62J 45/20; B62K 11/04; B62K 19/30; B62M 7/04
See application file for complete search history.

(56) References Cited

U.S. PATENT DOCUMENTS

| | | | | |
|---|---|---|---|---|
| 10,351,017 | B1 * | 7/2019 | Chen ................. | B62K 11/04 |
| 2013/0105240 | A1 * | 5/2013 | Tsai .................. | B62K 19/30 |
| | | | | 180/219 |
| 2015/0329174 | A1 * | 11/2015 | Inoue ................ | H01M 2/1083 |
| | | | | 429/71 |

(Continued)

FOREIGN PATENT DOCUMENTS

| | | |
|---|---|---|
| EP | 1122159 A2 | 8/2001 |
| JP | 4216965 | 1/2009 |

(Continued)

OTHER PUBLICATIONS

Indian Office Action dated Jun. 10, 2020, English translation included, 5 pages.

(Continued)

*Primary Examiner* — Tony H Winner
(74) *Attorney, Agent, or Firm* — Rankin, Hill & Clark LLP

(57) ABSTRACT

A saddle riding vehicle includes: a pair of left and right seat rails disposed below a seat for a passenger; a battery disposed below the seat; and an ECU for controlling a drive source of the vehicle, wherein when viewed from above, the battery and the electronic control unit are arranged side by side in a vehicle width direction between the left and right seat rails.

9 Claims, 11 Drawing Sheets

(56) References Cited

U.S. PATENT DOCUMENTS

2016/0288860 A1\* 10/2016 Tani ................. B62K 19/30
2019/0077482 A1\* 3/2019 Morotomi .............. B62K 11/04
2019/0176924 A1\* 6/2019 Iwata .................... B62K 25/20

FOREIGN PATENT DOCUMENTS

| JP | 2009-177164 A | 8/2009 | | |
|----|---------------|--------|----|----|
| JP | WO2016/159892 | \* | 6/2016 | ............ B62K 19/30 |
| JP | 2019-043390 A | 3/2019 | | |
| WO | 2016/159892 A1 | 10/2016 | | |
| WO | 2017/056167 | 4/2017 | | |

OTHER PUBLICATIONS

European Search Report dated Apr. 4, 2019, 7 pages.
Japanese Office Action with English Translation dated Jul. 23, 2019, 9 pages.

\* cited by examiner

SADDLE RIDING VEHICLE

INCORPORATION BY REFERENCE

The present application claims priority under 35 U.S.C. § 119 to Japanese Patent Application No. 2017-223594 filed on Nov. 21, 2017. The content of the application is incorporated herein by reference in its entirety.

TECHNICAL FIELD

The present invention relates to a saddle riding vehicle.

BACKGROUND ART

Conventionally, with respect to a saddle riding vehicle, there has been known a saddle riding vehicle where a battery is disposed below a seat for a passenger and between left and right seat rails (see patent literature 1, for example).

CITATION LIST

Patent Literature

[Patent Literature 1] WO 2017/056167

SUMMARY OF INVENTION

Technical Problem

In the above-mentioned conventional saddle riding vehicle, the battery can be disposed below the seat and between the left and right seat rails in a compact manner. However, there has been a demand for a saddle riding vehicle where an electronic control unit for controlling a drive source of a vehicle can be disposed below a seat in a compact manner together with a battery.

The present invention has been made in view of the above-mentioned circumstances, and it is an object of the present invention to provide a saddle riding vehicle where a battery and an electronic control unit can be disposed below a seat in a compact manner.

Solution to Problem

An aspect of the present invention is directed to a saddle riding vehicle which includes: a pair of left and right seat rails (19) disposed below a seat (14) for a passenger; a battery (60) disposed below the seat (14); and an electronic control unit (61) for controlling a drive source (11) of the vehicle. In the saddle riding vehicle, when viewed from above, the battery (60) and the electronic control unit (61) are arranged side by side in a vehicle width direction between the left and right seat rails (19).

In the aspect of the above-mentioned invention, a main harness (69) of an electric system may be wired in a longitudinal direction of the vehicle between the battery (60) and the electronic control unit (61).

In the aspect of the above-mentioned invention, an upper surface (60a) of the battery (60) and an upper surface (61b) of the electronic control unit (61) may be formed flush with each other.

In the aspect of the above-mentioned invention, the saddle riding vehicle may further include: a pair of left and right pivot frames (18) supporting a swing arm (13) which supports a rear wheel (3); and a pair of left and right sub frames (20) extending rearwardly and upwardly from the left and right pivot frames (18), the pair of left and right sub frames (20) being connected to the left and right seat rails (19), wherein as viewed in the side view of the vehicle, a space portion (71) surrounded by the pivot frames (18), the seat rails (19), and the sub frames (20) may be formed, and an electric component (72, 73) may be disposed in the space portion (71) on a side where the electronic control unit (61) is disposed in a lateral direction of the vehicle.

In the aspect of the above-mentioned invention, the saddle riding vehicle may further include an electric component storing box (67) in which the battery (60) and the electronic control unit (61) are provided, wherein the electric component storing box (67) may have a partition wall (80) between the battery (60) and the electronic control unit (61), and the main harness (69) may be disposed above the partition wall (80) between the battery (60) and the electronic control unit (61).

In the aspect of the above-mentioned invention, the electric component storing box (67) may be integrally formed with a front end portion of a rear fender (55).

In the aspect of the above-mentioned invention, an intake duct (90) of an intake device (41) may be disposed above the electric component storing box (67) and in front of the battery (60).

In the aspect of the above-mentioned invention, the battery (60) may be disposed vertically such that a plus terminal portion (60p) and a minus terminal portion (60n) are positioned on an upper surface of the battery (60), and the battery (60) may be disposed in a direction that the plus terminal portion (60p) is disposed closer to the main harness (69) than the minus terminal portion (60n).

Advantageous Effects of Invention

The saddle riding vehicle according to the aspect of the present invention includes: the pair of left and right seat rails disposed below the seat for a passenger; the battery disposed below the seat; and the electronic control unit for controlling the drive source of the vehicle, wherein when viewed from above, the battery and the electronic control unit are arranged side by side in a vehicle width direction between the left and right seat rails.

With such a configuration, the battery and the electronic control unit are arranged side by side in the vehicle width direction between the left and right seat rails and hence, the battery and the electronic control unit can be disposed below the seat in a compact manner in a longitudinal direction of the vehicle.

In the aspect of the above-mentioned invention, the main harness of the electric system may be wired in a longitudinal direction of the vehicle between the battery and the electronic control unit. With such a configuration, the main harness can be disposed in a compact manner by making use of a space between the battery and the electronic control unit. Further, the main harness is wired in a longitudinal direction of the vehicle and hence, wiring efficiency of the main harness is enhanced.

In the aspect of the above-mentioned invention, the upper surface of the battery and the upper surface of the electronic control unit may be formed flush with each other. With such a configuration, other components can be easily disposed above the battery and the electronic control unit.

In the aspect of the above-mentioned invention, the saddle riding vehicle may further include: the pair of left and right pivot frames supporting the swing arm which supports the rear wheel; and the pair of left and right sub frames extending rearwardly and upwardly from the left and right pivot frames, the pair of left and right sub frames being connected to the left and right seat rails, wherein as viewed in the side view of the vehicle, the space portion surrounded by the pivot frames, the seat rails, and the sub frames may be formed, and the electric component may be disposed in the space portion on a side where the electronic control unit is disposed in a lateral direction of the vehicle. With such a configuration, a passenger can easily get access to an electric component through the space portion, and the electric component can be effectively protected by the pivot frames, the seat rails, and the sub frames. Further, the electric component is disposed close to the electronic control unit and hence, the electric component can be easily connected to the electronic control unit.

In the aspect of the above-mentioned invention, the saddle riding vehicle may further include the electric component storing box in which the battery and the electronic control unit are provided, wherein the electric component storing box may have the partition wall between the battery and the electronic control unit, and the main harness may be disposed above the partition wall between the battery and the electronic control unit. With such a configuration, the battery and the electronic control unit can be protected by the electric component storing box. Further, the electronic control unit and the battery can be disposed in a suitably separated manner by the partition wall, and a vertical position of the main harness can be restricted by the partition wall.

In the aspect of the above-mentioned invention, the electric component storing box may be integrally formed with the front end portion of the rear fender. With such a configuration, the number of parts can be reduced so that the structure can be simplified.

In the aspect of the above-mentioned invention, the intake duct of the intake device may be disposed above the electric component storing box and in front of the battery. With such a configuration, the intake duct can be protected by the electric component storing box, and the intake duct can be disposed in a compact manner by making use of the space in front of the battery.

In the aspect of the above-mentioned invention, the battery may be disposed vertically such that the plus terminal portion and the minus terminal portion are positioned on the upper surface of the battery, and the battery may be disposed in a direction that the plus terminal portion is disposed closer to the main harness than the minus terminal portion. With such a configuration, the plus terminal portion can be easily connected to the main harness.

DESCRIPTION OF EMBODIMENTS

Hereinafter, an embodiment of the present invention is described with reference to drawings. In the description, directions of front and rear, left and right, and up and down are equal to directions of a vehicle body unless otherwise specified. In the respective drawings, symbol FR indicates a front side of the vehicle body, symbol UP indicates an upper side of the vehicle body, and symbol LH indicates a left side of the vehicle body.

Figure 1:
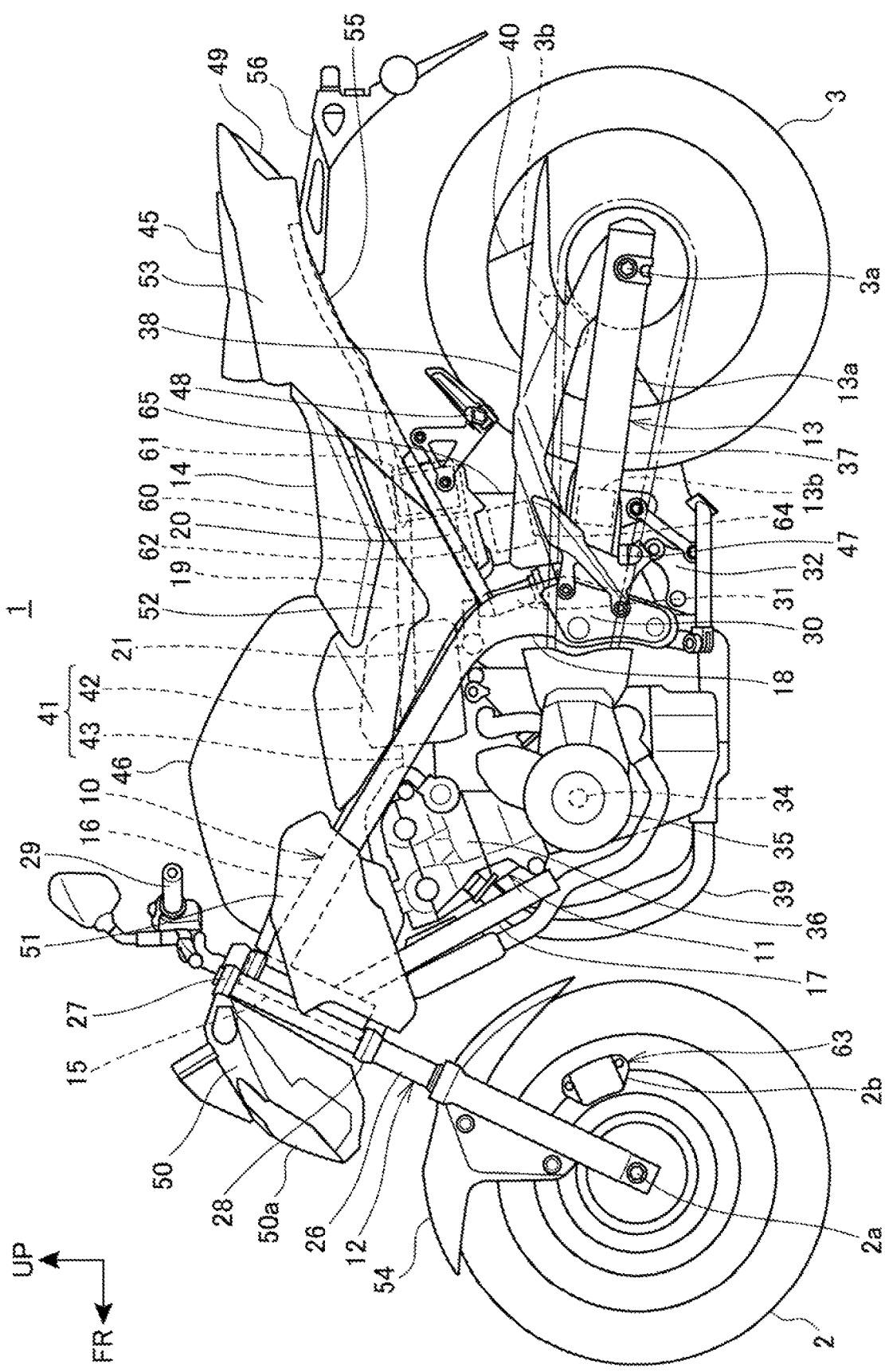
FIG. 1 is a left side view of a motorcycle according to an embodiment of the present invention.

FIG. 1 is a left side view of a motorcycle 1 according to the embodiment of the present invention. In FIG. 1, with respect to constitutional parts which are provided as a left and right pair respectively, only the part on a left side is shown in the drawing with a symbol.

The motorcycle 1 is a vehicle where an engine 11 (drive source) which forms a power unit is supported by a body frame 10, a steering system 12 which steerably supports a front wheel 2 (wheel) is steerably supported by the front end of the body frame 10, and a swing arm 13 which supports a rear wheel 3 (wheel) is provided on a rear portion side of the body frame 10. The motorcycle 1 is a saddle riding vehicle where a seat 14 on which a passenger (rider) is seated in a straddling manner is provided above a rear portion of the body frame 10.

The body frame 10 includes: a single head pipe 15 positioned at the center in a vehicle width direction; a pair of left and right main frames 16, 16; a pair of left and right down frames 17, 17; a pair of left and right pivot frames 18, 18; a pair of left and right seat rails 19, 19; and a pair of left and right sub frames 20, 20. The body frame 10 also includes a cross frame 21 which extends in a vehicle width direction and connects the left and right pivot frames 18, 18 to each other.

The head pipe 15 is provided on a front end of the body frame 10, and supports the steering system 12.

The main frames 16, 16 extend from an upper portion of the head pipe 15 rearwardly in a rearwardly descending manner.

The down frames 17, 17 extend from a lower portion of the head pipe 15 rearwardly and downwardly.

The pivot frames 18, 18 extend from rear end portions of the main frames 16, 16 downwardly.

The seat rails 19, 19 extend from the rear end portions of the main frames 16, 16 rearwardly.

The sub frames 20, 20 extend from the pivot frames 18, 18 rearwardly and upwardly and connected to rear portions of the seat rails 19, 19.

The steering system 12 includes: a steering shaft (not shown in the drawing) rotatably and pivotally supported on the head pipe 15; a pair of left and right front forks 26, 26; a top bridge 27 fixed to an upper end of the steering shaft and connecting upper portions of the left and right front forks 26, 26; a bottom bridge 28 fixed to a lower end of the steering shaft and connecting the left and right front forks 26, 26; and a handlebar 29 fixed to an upper portion of the top bridge 27.

The front wheel 2 is pivotally supported on a front wheel axel 2*a* extended between lower end portions of the front forks 26, 26.

The swing arm 13 includes: a pair of left and right arm portions 13*a*, 13*a* extending in a longitudinal direction of the vehicle; and a cross member 13*b* connecting front portions of the arm portions 13*a*, 13*a* in a vehicle width direction.

In the swing arm 13, front end portions of the arm portions 13*a*, 13*a* are pivotally supported on a pivot shaft 30 extended between the left and right pivot frames 18, 18. With such a configuration, the swing arm 13 is vertically swingable about the pivot shaft 30.

The rear wheel 3 which forms a drive wheel is pivotally supported on a rear wheel axel 3*a* extended between rear end portions of the arm portions 13*a*, 13*a*.

A cylindrical cushion unit 31 extending vertically is suspended between the swing arm 13 and the body frame 10.

The engine 11 is disposed between the down frames 17, 17 and the pivot frames 18, 18 below the main frames 16, 16 and is supported by the body frame 10.

The engine 11 includes: a crankcase 35 housing a crankshaft 34 extending in a vehicle width direction; and a cylinder portion 36 extending upwardly from an upper portion of a front portion of the crankcase 35.

A transmission (not shown in the drawing) outputting a drive force while decelerating the rotation of the engine 11 is incorporated in a rear portion of the crankcase 35. An output of the engine 11 is transmitted to the rear wheel 3 by way of a drive chain 37 extended between an output shaft of the transmission and the rear wheel 3. The drive chain 37 extends from the output shaft to the rear wheel 3 along an upper side and a lower side of the arm portion 13*a* on a left side. A chain cover 38 which covers the drive chain 37 from a side and from above is mounted on the arm portion 13*a* on a left side.

An exhaust pipe 39 of the engine 11 is pulled out downwardly from an exhaust port formed on a front surface of the cylinder portion 36, and extends rearwardly along a lower side of the crankcase 35. A rear end of the exhaust pipe 39 is connected to a muffler 40 disposed on a right side of the rear wheel 3.

An intake device 41 of the engine 11 is disposed behind the cylinder portion 36 and above a rear portion of the crankcase 35, and is connected to an intake port formed on a rear surface of the cylinder portion 36.

The intake device 41 includes an air cleaner box 42 and a throttle body 43 connected to the intake port.

The seat 14 is disposed above the seat rails 19, 19, and supported by the seat rails 19, 19. A rear seat 45 for a pillion passenger is provided behind and above the seat 14.

A fuel tank 46 is disposed between the seat 14 and the head pipe 15 in a longitudinal direction of the vehicle. The fuel tank 46 is disposed above the main frames 16, 16, and is supported by the main frames 16, 16.

A pair of left and right steps 47, 47 for a passenger is mounted on the pivot frames 18, 18. A pair of left and right pillion steps 48, 48 for a pillion passenger is mounted on the sub frames 20, 20.

The motorcycle 1 includes a vehicle body cover. The vehicle body cover includes: a front cover 50 which covers the head pipe 15 from a front side; a pair of left and right front side covers 51, 51 which covers the head pipe 15 and front end portions of the main frames 16, 16 from sides; side covers 52, 52 which cover the seat rails 19, 19 below the fuel tank 46 and the seat 14 from sides; and a rear cover 53 which covers rear end portions of the seat rails 19, 19. A head light 50*a* is provided on the front cover 50.

The motorcycle 1 includes: a front fender 54 which covers the front wheel 2 from above; and a rear fender 55 which covers the rear wheel 3 from above.

A license plate holder 56 extends from a rear end portion of the rear fender 55 rearwardly and downwardly. The license plate holder 56 functions also as a fender for the rear wheel 3.

The motorcycle 1 includes, below the seat 14, a battery 60, an electronic control unit 61 (referred to as an ECU 61 hereinafter), and a regulator 62 connected to a generator of the engine 11 and the battery 60.

The motorcycle 1 also includes a braking device 63 for braking the front wheel 2 and the rear wheel 3.

The braking device 63 includes: a hydraulic front wheel brake 2*b* which applies braking to the front wheel 2; a hydraulic rear wheel brake 3*b* which applies braking to the rear wheel 3; a master cylinder (not shown in the drawing) which a passenger operates by way of a lever or a pedal; and an anti-lock brake system (ABS) module 64 (hydraulic control device) which operates so as to avoid locking of the front wheel 2 and the rear wheel 3 at the time of performing a braking operation.

The front wheel brake 2*b* and the rear wheel brake 3*b* apply braking to the wheels such that brake discs respectively provided on the front wheel 2 and the rear wheel 3 are clamped by calipers using a liquid pressure.

The ABS module 64 is connected to the caliper of the front wheel brake 2*b* and the caliper of the rear wheel brake 3*b* respectively by way of brake hoses. The ABS module 64 regulates liquid pressures supplied to the calipers according to liquid pressures inputted from the above-mentioned master cylinder to the ABS module 64, and applies braking to the front wheel 2 and the rear wheel 3. Further, when a locking behavior of the front wheel 2 or the rear wheel 3 is detected by a sensor, the ABS module 64 regulates a liquid pressure of the caliper on a side where the locking behavior is detected thus avoiding locking of the wheel.

The ABS module 64 is formed in a box shape, and includes a motor which is operated so as to regulate liquid pressures, a hydraulic circuit part and the like as integral parts thereof.

The ABS module 64 is disposed behind the cushion unit 31 above a front portion of the swing arm 13, and is positioned below the seat 14.

The ABS module 64 is covered by a cover member 65.

Figure 2:
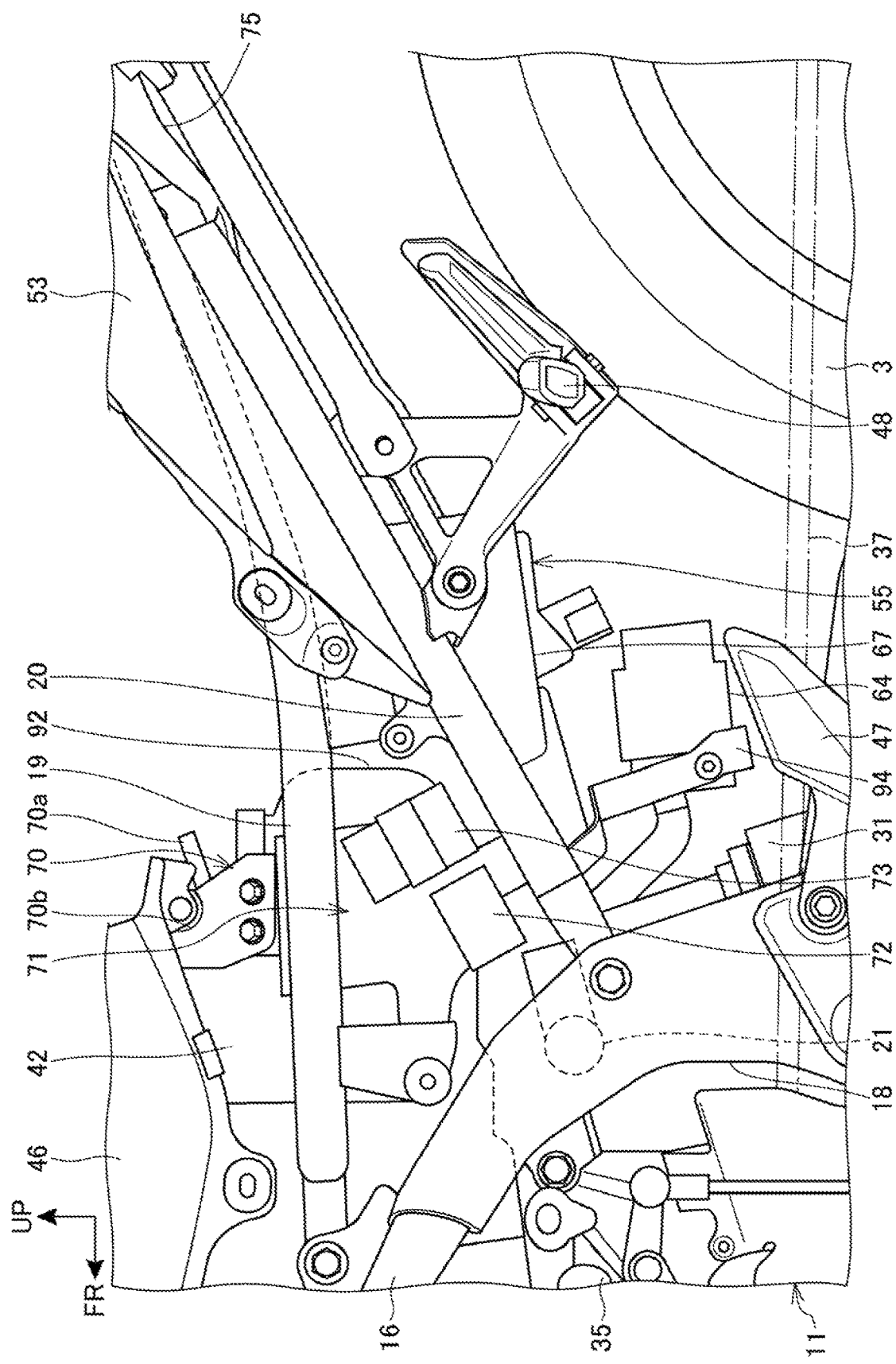
FIG. 2 is a left side view of a portion of the motorcycle below a seat.
Figure 3:
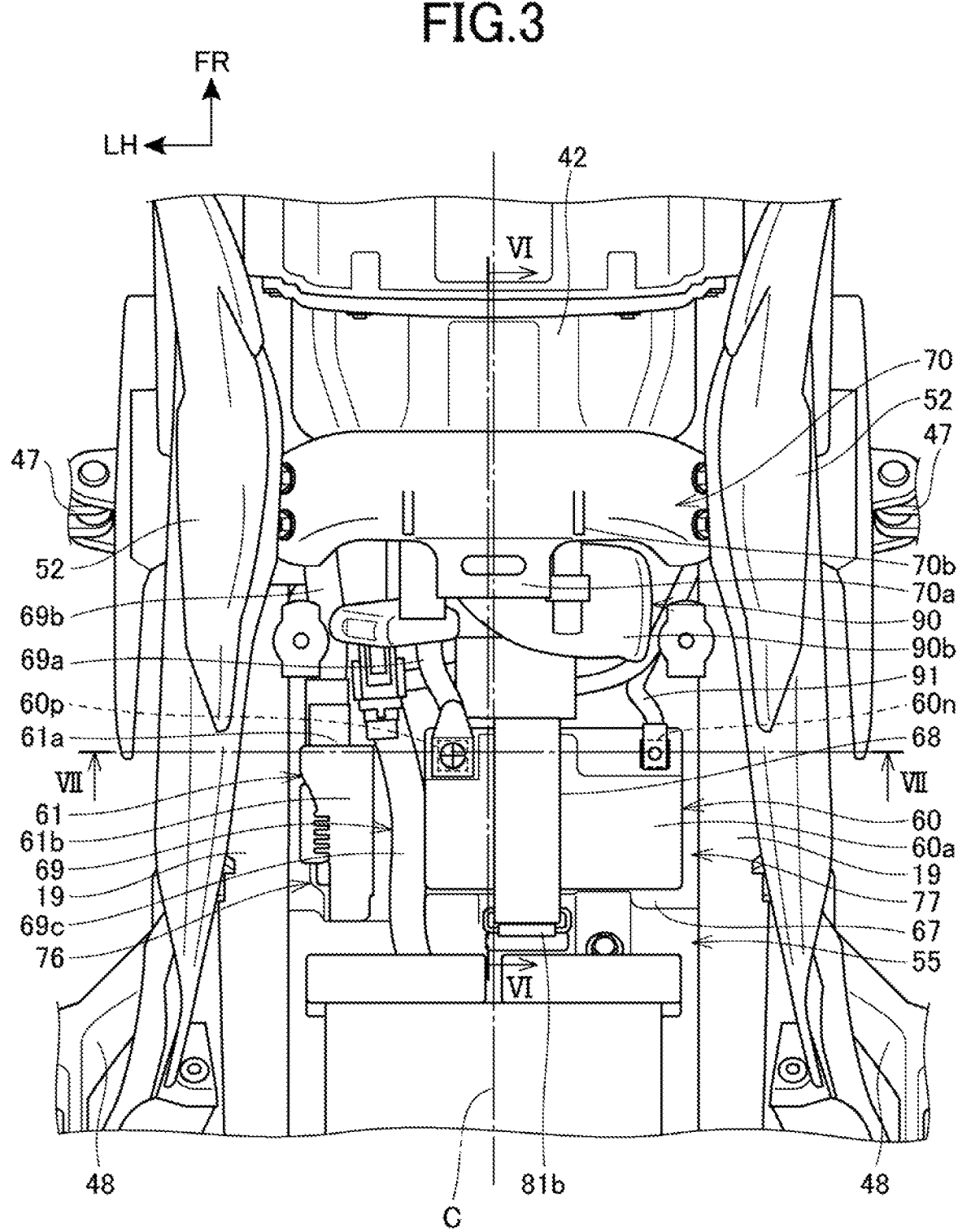
FIG. 3 is a plan view of seat rails and a portion around the seat rails when viewed from above in a state where the seat is removed from the motorcycle.

FIG. 2 is a left side view of a portion of the motorcycle 1 below the seat 14. FIG. 3 is a plan view of the seat rails 19, 19 and a portion around the seat rails 19, 19 when viewed from above in a state where the seat 14 is removed from the motorcycle 1. FIG. 2 shows a state where the seat 14, the side covers 52, the cover member 65 and the chain cover 38 are removed from the motorcycle 1.

As shown in FIG. 3, the battery 60 and the ECU 61 are disposed between the left and right seat rails 19, 19 when viewed from above.

An electric component storing box 67 is provided below the seat rails 19, 19, and the battery 60 and the ECU 61 are stored in the electric component storing box 67. The battery 60 is fixed by a band member 68 mounted in the electric component storing box 67. The electric component storing box 67 is integrally formed with the rear fender 55.

A main harness 69 of an electric system is wired below the seat 14 and between the left and right seat rails 19, 19.

Front portions of the seat rails 19, 19 are connected to each other by a connecting member 70 extending in a vehicle width direction. The connecting member 70 is formed in an arc shape and extending upwardly from the seat rails 19, 19. The connecting member 70 includes a stay portion 70a which engages with a front end portion of the seat 14, and a tank fixing portion 70b to which a rear end portion of the fuel tank 46 is connected.

The connecting member 70 is disposed in front of the battery 60 and the ECU 61, and covers a rear portion of the air cleaner box 42 from above.

As shown in FIG. 2, as viewed in the side view of the vehicle, an approximately triangular space portion 71, 71 which is surrounded by a rear end portion of the main frame 16, 16, an upper portion of the pivot frame 18, 18, the seat rail 19, 19 and the sub frame 20, 20 is formed on left and right sides of the vehicle respectively. In the space portion 71 on one side (left side) in a vehicle width direction, a starter magnet switch 72 and a relay 73 are disposed as electric components. The starter magnet switch 72 is a switch which changes over the supply of an electric current to a cell motor (not shown in the drawing) for starting the engine 11.

The main harness 69 is a wire in which a plurality of electric wires (harnesses) are arranged in bundles, and extend a long distance in a longitudinal direction from a front end portion to a rear end portion of the motorcycle 1. The respective harnesses branched from the main harness 69 are connected to the respective electric components of the motorcycle 1. For example, the head light 50a, the engine 11, the ECU 61, the regulator 62, the starter magnet switch 72, the ABS module 64, and a tail lamp 49 (see FIG. 1) are connected to the battery 60 by the respective harnesses branched from the main harness 69.

Figure 4:
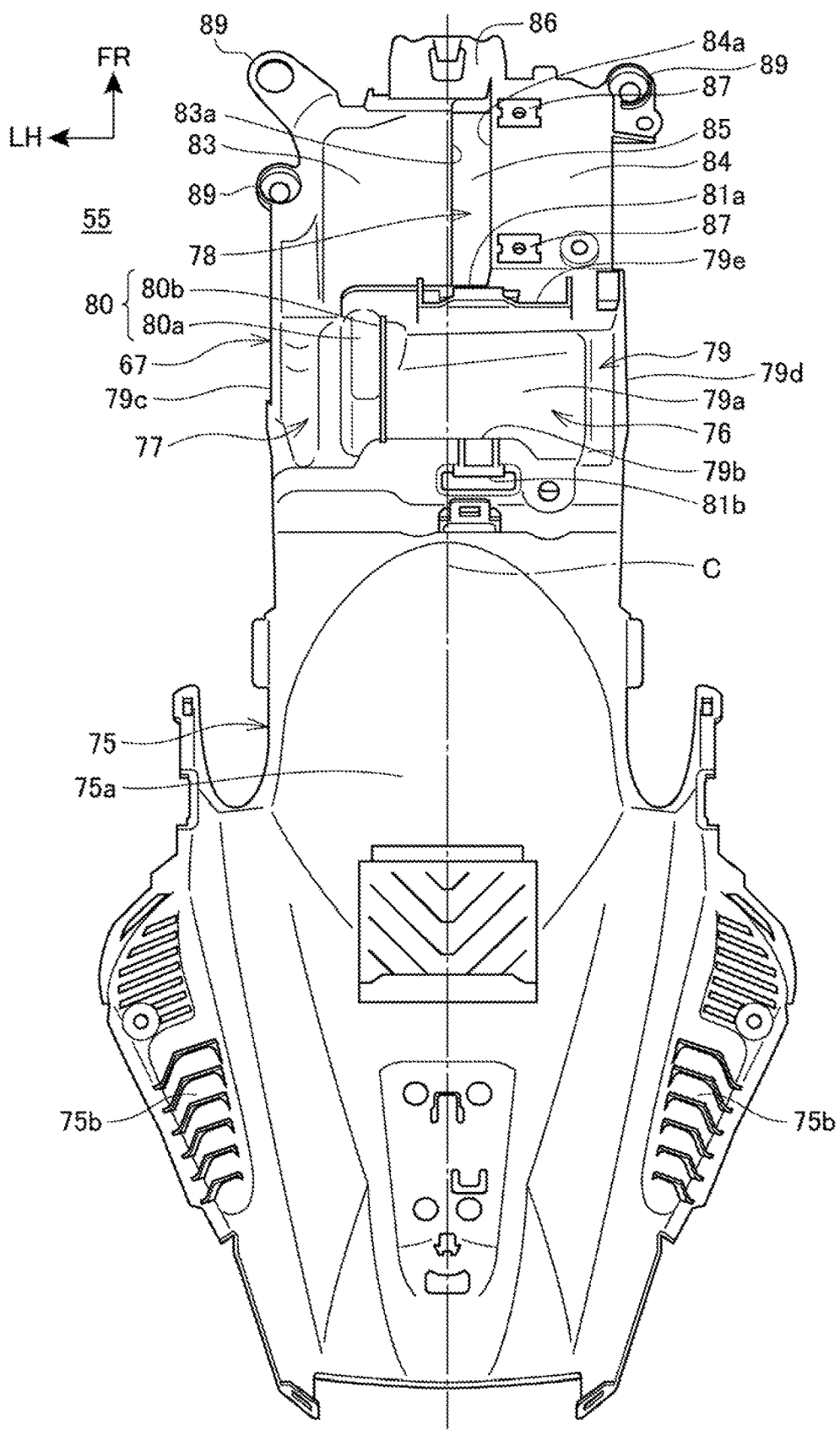
FIG. 4 is a plan view of a rear fender when viewed from above.

FIG. 4 is a plan view of the rear fender 55 when viewed from above.

With reference to FIG. 2 and FIG. 4, the rear fender 55 includes a fender body portion 75 which covers the rear wheel 3 from above, and the electric component storing box 67 as integral parts thereof. The electric component storing box 67 is provided on a front end portion of the rear fender 55, and is positioned in front of the fender body portion 75. The rear fender 55 is formed as an integral body by resin molding, for example.

As viewed in a side view, the rear fender 55 is disposed in a rearwardly and upwardly inclined manner along the sub frames 20, 20, and extends from front end portions to rear end portions of the sub frames 20, 20. The rear fender 55 is provided so as to straddle over the sub frames 20, 20 in a vehicle width direction, and closes a space between the left and right sub frames 20, 20. The rear fender 55 is mounted on the sub frames 20, 20.

A bulging portion 75a which bulges upwardly in a curved shape so as to follow an upper surface of the rear wheel 3 is formed on a center portion of the fender body portion 75 in a vehicle width direction, and grip portions 75b, 75b for a pillion passenger are formed on left and right side portions of the fender body portion 75. A pillion passenger seated on the rear seat 45 can grasp the grip portions 75b, 75b from below with his hands.

The electric component storing box 67 is provided in front of the bulging portion 75a.

Figure 5:
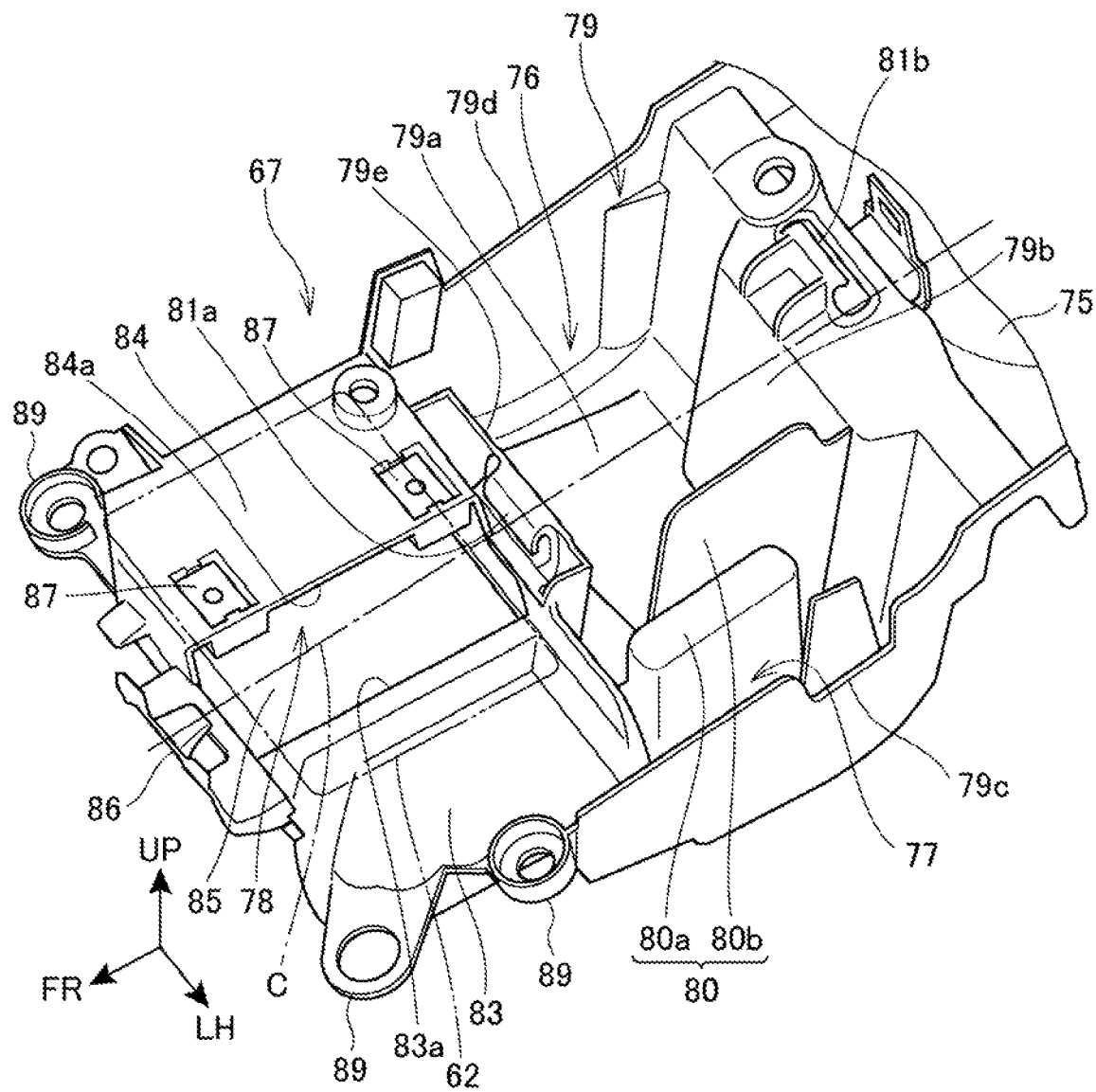
FIG. 5 is a perspective view of an electric component storing box as viewed from a left upper side.

FIG. 5 is a perspective view of the electric component storing box 67 as viewed from a left upper side.

As shown in FIG. 4 and FIG. 5, the electric component storing box 67 includes: a battery storing portion 76 in which the battery 60 is accommodated; an ECU storing portion 77 in which the ECU 61 is stored; and a regulator storing portion 78 in which the regulator 62 is stored.

The electric component storing box 67 includes an upwardly opening box-shaped portion 79. The box-shaped portion 79 is continuously formed on a front end of the fender body portion 75. The battery storing portion 76 and the ECU storing portion 77 are provided on the box-shaped portion 79.

The box-shaped portion 79 includes: a bottom wall portion 79a positioned below the front end of the fender body portion 75; a rear wall portion 79b extending upwardly from a rear edge of the bottom wall portion 79a and connected to the front end of the fender body portion 75; side wall portions 79c, 79d respectively raised upwardly from left and right side edges of the bottom wall portion 79a; and a front wall portion 79e raised upwardly from a front edge of the bottom wall portion 79a.

The box-shaped portion 79 includes a partition wall 80 by which the inside of the box-shaped portion 79 is partitioned in a vehicle width direction. A space defined in the box-shaped portion 79 is partitioned into the battery storing portion 76 and the ECU storing portion 77 by the partition wall 80.

The battery storing portion 76 is a space defined by the partition wall 80, the side wall portion 79d on a right side, the rear wall portion 79b, and the front wall portion 79e.

The ECU storing portion 77 is a space defined by the partition wall 80, the side wall portion 79c on a left side, the rear wall portion 79b, and the front wall portion 79e.

The partition wall 80 is arranged on one side (left side) in a vehicle width direction in an offset manner from a center line C in a vehicle width direction. With such an arrangement, the battery storing portion 76 is larger than the ECU storing portion 77 in a vehicle width direction.

The partition wall 80 includes: a wall body portion 80a extending in a longitudinal direction of the vehicle; and an extending portion 80b extending upwardly from a side edge of the wall body portion 80a on a battery storing portion 76 side beyond the wall body portion 80a.

A band locking portion 81a with which a front end of the band member 68 is locked is provided on an upper end of a front wall portion 70e of the battery storing portion 76. A band locking portion 81b with which a rear end of the band member 68 is locked is formed on an upper end of the rear wall portion 79b of the battery storing portion 76.

The regulator storing portion 78 includes: a first bottom wall portion 83; and a second bottom wall portion 84 which is provided in an offset manner in a vehicle width direction and upwardly with respect to the first bottom wall portion 83.

The first bottom wall portion 83 extends frontwardly from a front end of the ECU storing portion 77.

The second bottom wall portion 84 extends frontwardly from a front end of the battery storing portion 76. The second bottom wall portion 84 is provided in a state where a gap is formed between the second bottom wall portion 84 and an inner edge 83a of the first bottom wall portion 83 in a vehicle width direction and hence, an opening 85 elongated in a longitudinal direction of the vehicle is formed between the inner edge 83a and an inner edge 84a of the second bottom wall portion 84 when viewed from above. A front end of the opening 85 is closed by a connecting portion 86 which connects the first bottom wall portion 83 and the second bottom wall portion 84 in a vehicle width direction at a front end of the connecting portion 86.

The second bottom wall portion 84 is provided above the first bottom wall portion 83. When viewed from a side, a gap (opening) is formed vertically between the inner edge 84a of the second bottom wall portion 84 and the inner edge 83a of the first bottom wall portion 83.

That is, the opening 85 forms an opening when viewed from above as well as viewed in a side view. The opening 85 allows a space below the second bottom wall portion 84 to communicate with a first bottom wall portion 83 side.

A plurality of regulator fixing portions 87, 87 are provided on the second bottom wall portion 84 in a longitudinal direction of the vehicle along the inner edge 84*a*. Regulator fixing bolts 88, 88 (see FIG. 7) which fix the regulator 62 are made to pass through the regulator fixing portions 87, 87.

A plurality of fixing portions 89 which are fixed to sub frames 20, 20 by bolts or the like are provided on the regulator storing portion 78.

Figure 6:
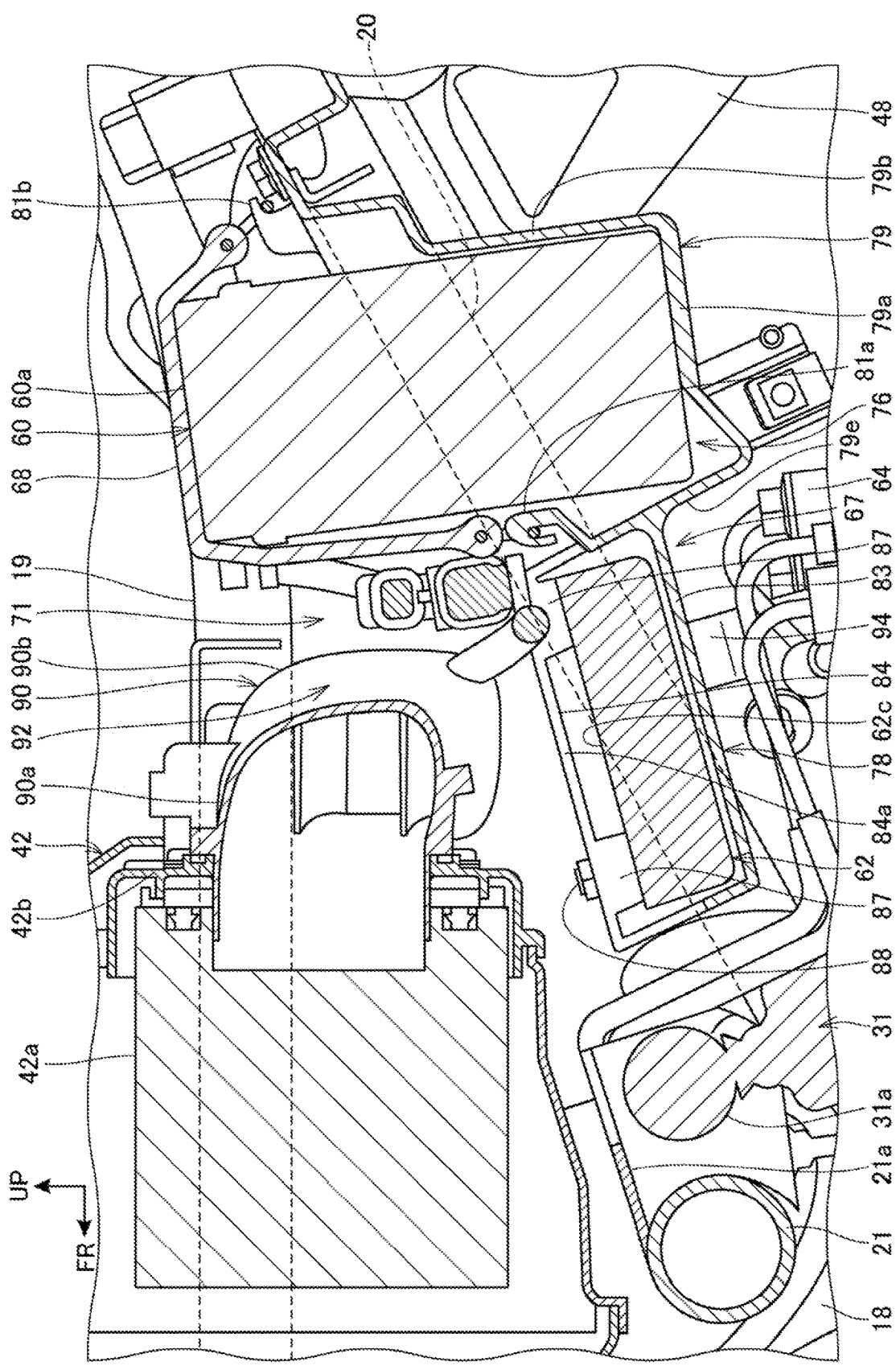
FIG. 6 is a cross-sectional view taken along a line VI-VI in FIG. 3.

FIG. 6 is a cross-sectional view taken along a line VI-VI in FIG. 3. In FIG. 6, the connecting member 70 is not shown.

With reference to FIG. 1, FIG. 2, FIG. 3 and FIG. 6, the air cleaner box 42 is disposed at a position below a rear portion of the fuel tank 46 and above the cushion unit 31. The air cleaner box 42 is disposed between the left and right seat rails 19, 19. As viewed in the side view of the vehicle, the air cleaner box 42 overlaps with rear end portions of the main frames 16, 16, upper end portions of the pivot frames 18, 18, and front portions of the seat rails 19, 19.

As shown in FIG. 6, an air filter 42*a* is stored in a rear portion of the inside of the air cleaner box 42. A space defined in the air cleaner box 42 is partitioned into a dirty side disposed upstream of the air filter 42*a*, and a clean side disposed downstream of the air filter 42*a* by the air filter 42*a*.

An intake duct 90 through which outside air is taken into the above-mentioned dirty side is provided on a rear surface portion 42*b* of the air cleaner box 42.

The intake duct 90 includes: a rearward extending portion 90*a* extending rearwardly from the rear surface portion 42*b*; and a sideward extending portion 90*b* being bent from the rearward extending portion 90*a* and extending toward the outside in a vehicle width direction.

The intake duct 90 is disposed between the seat rails 19, 19 and the sub frames 20, 20 in a vertical direction.

The rearward extending portion 90*a* is connected to the rear surface portion 42*b* at the center in the vehicle width direction. The sideward extending portion 90*b* extends toward a side opposite to a side where the ECU 61 is disposed in a vehicle width direction, and an outer end of the sideward extending portion 90*b* opens toward the space portion 71 on a right side.

Outside air taken from the intake duct 90 into the above-mentioned dirty side is purified by the air filter 42*a*, and flows into the throttle body 43 through the above-mentioned clean side.

An upper end portion 31*a* (see FIG. 6) of the cushion unit 31 is connected to a cushion stay 21*a* extending rearwardly from the cross frame 21 at the center in a vehicle width direction.

A lower end portion of the cushion unit 31 is connected to the swing arm 13 by way of a link mechanism 32 (see FIG. 1) disposed below the swing arm 13.

With reference to FIG. 3 and FIG. 6, the battery 60 is formed in a rectangular parallelepiped block shape. A plus terminal portion 60*p* and a minus terminal portion 60*n* are disposed on an upper surface 60*a* of the battery 60.

The battery 60 is disposed vertically in the battery storing portion 76 such that the plus terminal portion 60*p* and the minus terminal portion 60*n* are exposed above the battery 60.

The upper surface 60*a* of the battery 60 is formed in a rectangular shape elongated more in a vehicle width direction than a longitudinal direction of the vehicle when viewed from above. The plus terminal portion 60*p* and the minus terminal portion 60*n* are arranged side by side in a vehicle width direction on a front edge portion of the upper surface 60*a*. To be more specific, the plus terminal portion 60*p* is disposed at a position close to the center of a vehicle width, and the minus terminal portion 60*n* is disposed at a position outside the plus terminal portion 60*p* in a vehicle width direction and close to the seat rail 19 on a right side.

The battery 60 is positioned by fitting the battery 60 into the battery storing portion 76. The battery 60 is disposed close to the other side (right side) in a vehicle width direction with respect to the center line C in a vehicle width direction. A left end portion of the battery 60 and the plus terminal portion 60*p* are positioned on one side (left side) in a vehicle width direction with respect to the center line C.

The band member 68 passes through between the plus terminal portion 60*p* and the minus terminal portion 60*n* in a longitudinal direction of the vehicle, and presses the battery 60 toward a bottom wall portion 79*a* side by pushing the upper surface 60*a*.

A harness 69*a* branched from the main harness 69 is connected to the plus terminal portion 60*p*. A wire 91 connected to the minus terminal portion 60*n* extends frontwardly, and is connected to the body frame 10, for example.

Figure 7:
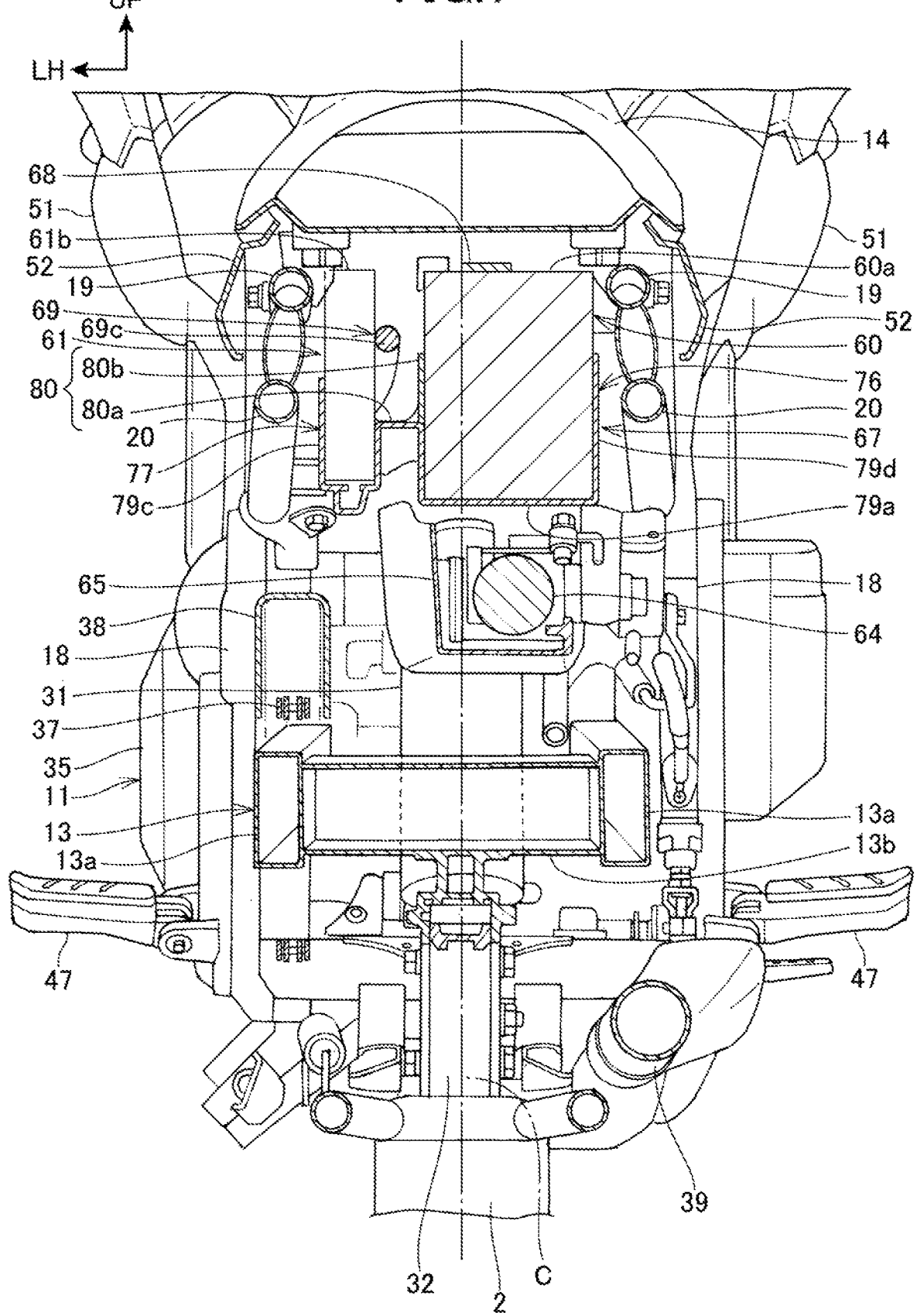
FIG. 7 is a cross-sectional view taken along a line VII-VII in FIG. 3.

FIG. 7 is a cross-sectional view taken along a line VII-VII in FIG. 3.

As shown in FIG. 3 and FIG. 7, the ECU 61 is formed into an approximately rectangular plate shape. The ECU 61 is disposed in the ECU storing portion 77 in a direction that a plate thickness direction of the ECU 61 is directed in a vehicle width direction.

A connecting portion 61*a* is disposed on a front surface of the ECU 61. A harness 69*b* branched from the main harness 69 is connected to the connecting portion 61*a*.

The ECU 61 electrically controls respective part of the motorcycle 1 such as the engine 11 and the ABS module 64.

The ECU 61 is placed and positioned in the ECU storing portion 77, and is disposed just beside the battery 60. The ECU 61 and the battery 60 are arranged side by side in a vehicle width direction between the left and right seat rails 19, 19.

That is, as viewed in the side view of the vehicle such as FIG. 1, the ECU 61 and the battery 60 overlap with each other. By arranging the ECU 61 and the battery 60 side by side in the vehicle width direction between the left and right seat rails 19, 19 in this manner, the ECU 61 and the battery 60 can be disposed in a compact manner in a longitudinal direction of the vehicle. Accordingly, other components can be easily disposed in front of and behind the ECU 61 and the battery 60.

As shown in FIG. 7, an upper surface 61*b* of the ECU 61 and the upper surface 60*a* of the battery 60 are made flush with each other and hence, the upper surfaces 61*b*, 60*a* are substantially at the same height position. Accordingly, other components can be easily disposed above the ECU 61 and the battery 60. For example, since the upper surface 61*b* and the upper surface 60*a* are flush and flat, a seat bottom surface of the seat 14 positioned above the ECU 61 and the battery 60 can be formed into a simple shape.

The ECU 61 and the battery 60 extend above the wall body portion 80*a* of the partition wall 80.

As shown in FIG. 3 and FIG. 7, the main harness 69 includes a longitudinal extending portion 69*c* wired in a longitudinal direction of the vehicle through a gap formed between the battery 60 and the ECU 61. With such a configuration, by making use of the gap formed between the battery 60 and the ECU 61, the main harness 69 can be wired while realizing space saving, and the main harness 69 can be guided in a longitudinal direction of the vehicle.

The longitudinal extending portion 69c of the main harness 69 passes just above the wall body portion 80a of the partition wall 80 in a longitudinal direction of the vehicle. With such a configuration, a vertical position of the longitudinal extending portion 69c can be easily restricted by the wall body portion 80a. Further, the longitudinal extending portion 69c can be isolated from the battery 60 by the extending portion 80b extending above from the wall body portion 80a.

The longitudinal extending portion 69c of the main harness 69 passes through the gap formed between the battery 60 and the ECU 61 and hence, the longitudinal extending portion 69c is disposed close to the plus terminal portion 60p. With such a configuration, the harness 69a of the main harness 69 can be made short.

Figure 8:
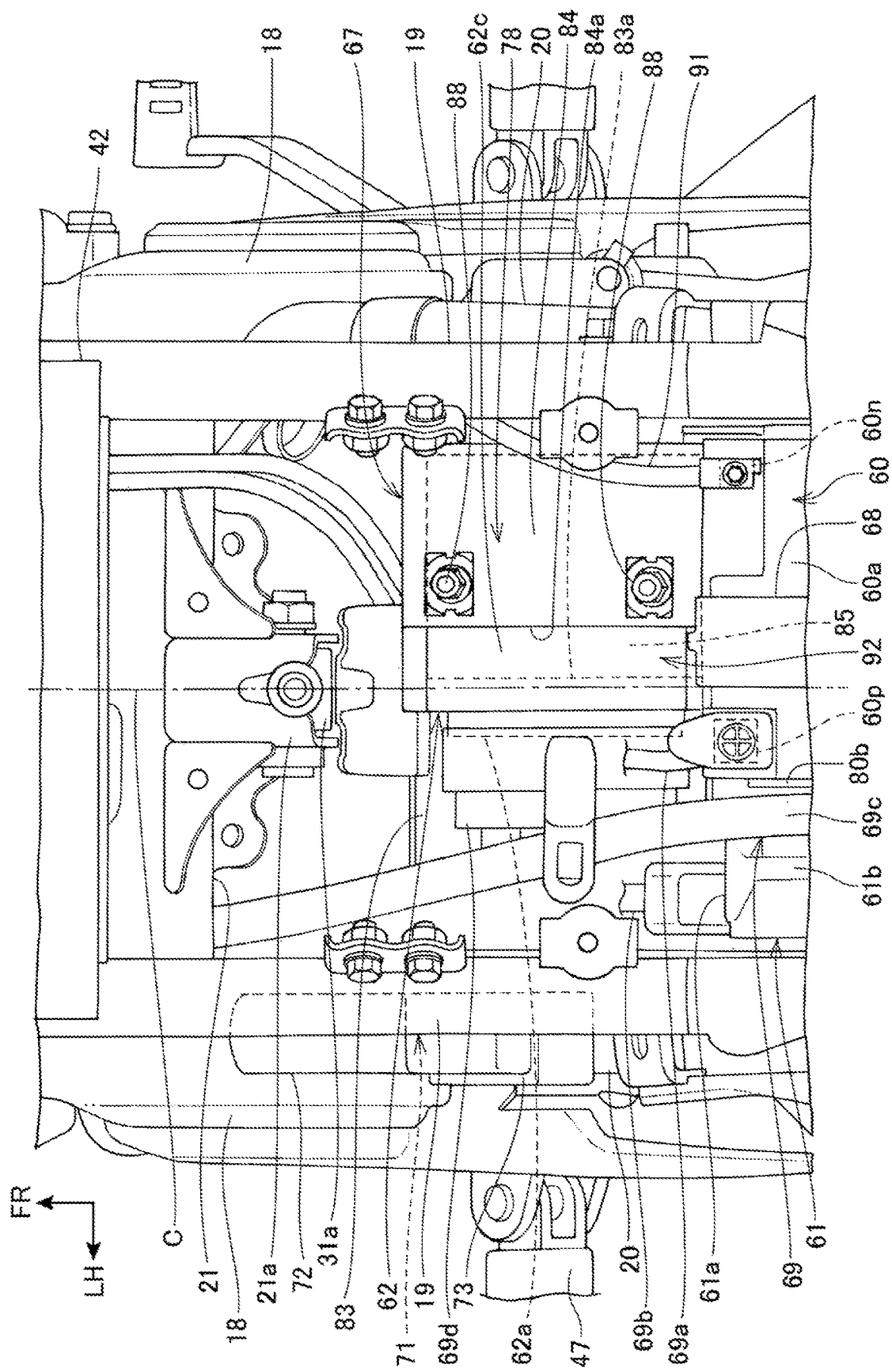
FIG. 8 is a plan view of a regulator and a portion around the regulator when viewed from above.
Figure 9:
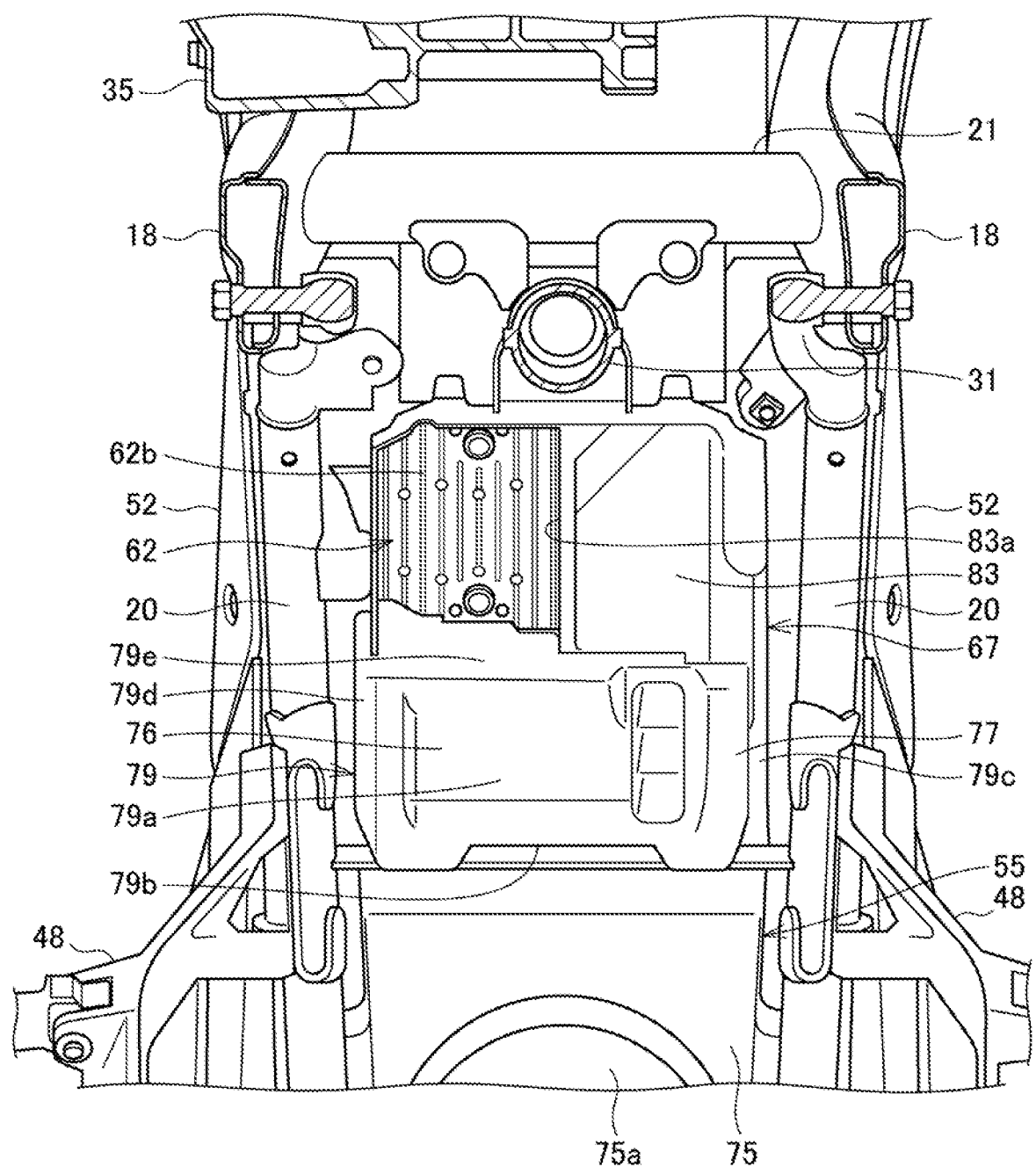
FIG. 9 is a view of the electric component storing box and a portion around the electric component storing box as viewed from below.

FIG. 8 is a plan view of the regulator 62 and a portion around the regulator 62 when viewed from above. FIG. 9 is a view of the electric component storing box 67 and a portion around the electric component storing box 67 as viewed from below. In FIG. 8, the connecting member 70, the side covers 52, 52, a rear portion of the air cleaner box 42, the intake duct 90 and the like are not shown.

With reference to FIG. 5, FIG. 6m and FIG. 8, the regulator 62 is formed in a block shape and is disposed such that a plate thickness direction of the regulator 62 is directed in a vertical direction. When viewed from above, the regulator 62 is formed in a rectangular shape where a size of the regulator 62 in a longitudinal direction of the vehicle is slightly larger than a size of the regulator 62 in a vehicle width direction.

The regulator 62 is connected to the main harness 69. The regulator 62 rectifies an electric current generated by the engine 11, and supplies the rectified electric current to the battery 60.

The regulator 62 is fixed to the regulator storing portion 78, and is disposed in front of the battery 60. The regulator 62 is positioned just in front of a front surface of the battery 60 and hence, as viewed from a front side of the vehicle, the regulator 62 overlaps with the battery 60 from a front side. As viewed in the side view of the vehicle, the regulator 62 overlaps with front end portions of the sub frames 20, 20.

The regulator 62 is disposed in an offset manner in a vehicle width direction with respect to the center line C in a vehicle width direction. To be more specific, the regulator 62 is provided in an offset manner toward a side opposite to the ECU 61 side (longitudinal extending portion 69c side) in a vehicle width direction with respect to the center line C.

A wire connecting portion 62a (see FIG. 8) is disposed on a side surface of the regulator 62 on an ECU 61 side. A coupler 69d of a harness branched from the main harness 69 is connected to the wire connecting portion 62a. Fins 62b for heat radiation are disposed on a lower surface of the regulator 62.

The regulator 62 is provided so as to be inserted into the opening 85 of the regulator storing portion 78 from a side such that the regulator 62 is directed toward a space on a lower side of the second bottom wall portion 84, and is fixed to a lower surface of the second bottom wall portion 84. The regulator 62 is fixed to the second bottom wall portion 84 by regulator fixing bolts 88, 88 which pass through the regulator fixing portions 87, 87.

To be more specific, the regulator 62 is positioned below the second bottom wall portion 84, and the fins 62b formed on the lower surface of the regulator 62 are exposed in a space below the electric component storing box 67. With such a configuration, it is possible to make air efficiently impinge on the fins 62b and hence, the regulator 62 can be effectively cooled. Portions of the fins 62b are exposed downward from the opening 85.

The regulator 62 extends toward the first bottom wall portion 83 side straddling over the center line C, and an end portion of the regulator 62 on the ECU 61 side including the wire connecting portion 62a is positioned above the first bottom wall portion 83. That is, the wire connecting portion 62a of the regulator 62 and the coupler 69d are covered by the first bottom wall portion 83 from below. With such a configuration, the wire connecting portion 62a and the coupler 69d can be protected by the first bottom wall portion 83.

As shown in FIG. 6, a lower surface of the regulator 62 and a lower surface of the battery 60 are substantially at the equal position in a vertical direction. However, the battery 60 is vertically longer than the regulator 62 and hence, the upper surface 60a of the battery 60 is positioned above an upper surface 62c of the regulator 62.

That is, the upper surface 62c of the regulator 62 is disposed below the upper surface 60a of the battery 60 in front of the battery 60 and hence, the regulator 62 and the battery 60 are disposed such that a stepped portion 92 is formed in a longitudinal direction of the vehicle. The stepped portion 92 is a space positioned just above the regulator 62 and below the upper surface 60a of the battery 60.

With such a configuration, by arranging the regulator 62 and the battery 60 in a longitudinally aligned state, the regulator 62 and the battery 60 can be disposed in a compact manner below the seat 14, and the regulator 62 and the battery 60 can be simply connected to each other using a short harness.

As shown in FIG. 2 and FIG. 8, the starter magnet switch 72 and the relay 73 are disposed in an approximately triangular space portion 71, and the starter magnet switch 72 and the relay 73 overlap the seat rail 19 on a left side and the sub frame 20 on a left side when viewed from above. With such a configuration, the starter magnet switch 72 and the relay 73 can be disposed in a compact manner in the space portion 71, and the starter magnet switch 72 and the relay 73 can be effectively protected by the body frame 10 which defines the space portion 71.

As shown in FIG. 3 and FIG. 6, the intake duct 90 of the air cleaner box 42 is disposed on the stepped portion 92, and is positioned in front of the battery 60 below the seat 14 and above the regulator 62.

With such a configuration, by arranging the intake duct 90 by making use of the stepped portion 92 formed by the arrangement of the regulator 62 and the battery 60, the intake duct 90 can be disposed in a compact manner below the seat 14. Further, the intake duct 90 is provided close to the regulator 62 and hence, the battery 60 and the regulator 62 can be efficiently cooled by an air flow generated by intake air.

Figure 10:
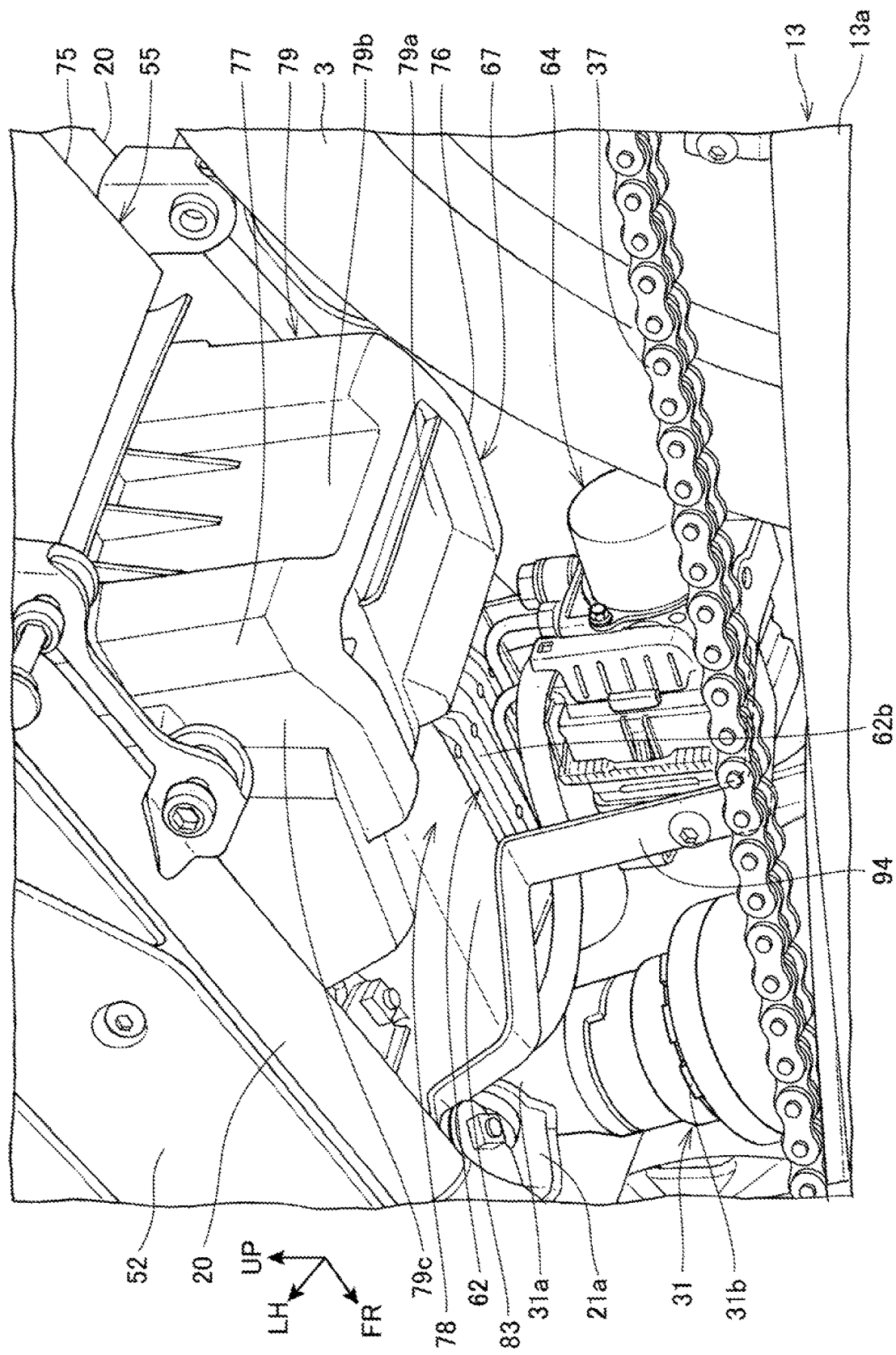
FIG. 10 is a perspective view showing a mounting state of an ABS module as viewed from a rear side.

FIG. 10 is a perspective view showing a mounting state of the ABS module 64 as viewed from a rear side.

As shown in FIG. 1, FIG. 7 and FIG. 10, the ABS module 64 is provided behind the cushion unit 31 and in front of the rear wheel 3 as well as below the regulator 62 and above the cross member 13b of the swing arm 13.

Further, as shown in FIG. 7, the cushion unit 31 is disposed on the center line C in the vehicle width direction in the same manner as the front wheel 2. An adjusting mechanism 31b (FIG. 10) is disposed on an upper portion of the cushion unit 31. The adjusting mechanism 31b is exposed to the outside through between the upper end portion 31a (FIG. 6) and the swing arm 13. The adjusting mechanism 31b is, for example, a ring nut for adjusting an initial load of a spring of the cushion unit 31.

The ABS module 64 is disposed in an offset manner with respect to the center line C in a vehicle width direction. To be more specific, the ABS module 64 is offset to the regulator 62 side (right side) with respect to the center line C.

That is, the ABS module 64 is offset in a vehicle width direction with respect to the cushion unit 31 positioned at the center of a vehicle width.

With such a configuration, when a user gets access to the adjusting mechanism 31b of the cushion unit 31 from the outside in a vehicle width direction from a left side, the ABS module 64 minimally obstructs such an access operation. Accordingly, the cushion unit 31 can be easily adjusted by way of the adjusting mechanism 31b.

As shown in FIG. 10, the ABS module 64 is fixed to a module stay 94 extending downwardly from the left and right sub frames 20, 20. The module stay 94 is routed around below the ABS module 64, and connects the sub frames 20, 20 in a vehicle width direction.

As shown in FIG. 1 and FIG. 7, a periphery and a lower surface of the ABS module 64 are covered by the cover member 65. Accordingly, even when the ABS module 64 is disposed in front of the rear wheel 3, it is possible to protect the ABS module 64 from splashing of water by the rear wheel 3.

In this embodiment, the ABS module 64, the battery 60, the regulator 62 and the ECU 61 are disposed in a concentrated manner at a position below the seat 14, in front of the rear wheel 3 and close to the engine 11. Accordingly, a mass can be concentrated at a center portion in a longitudinal direction of the motorcycle 1 and hence, the mobility of the motorcycle 1 can be enhanced.

Figure 11:
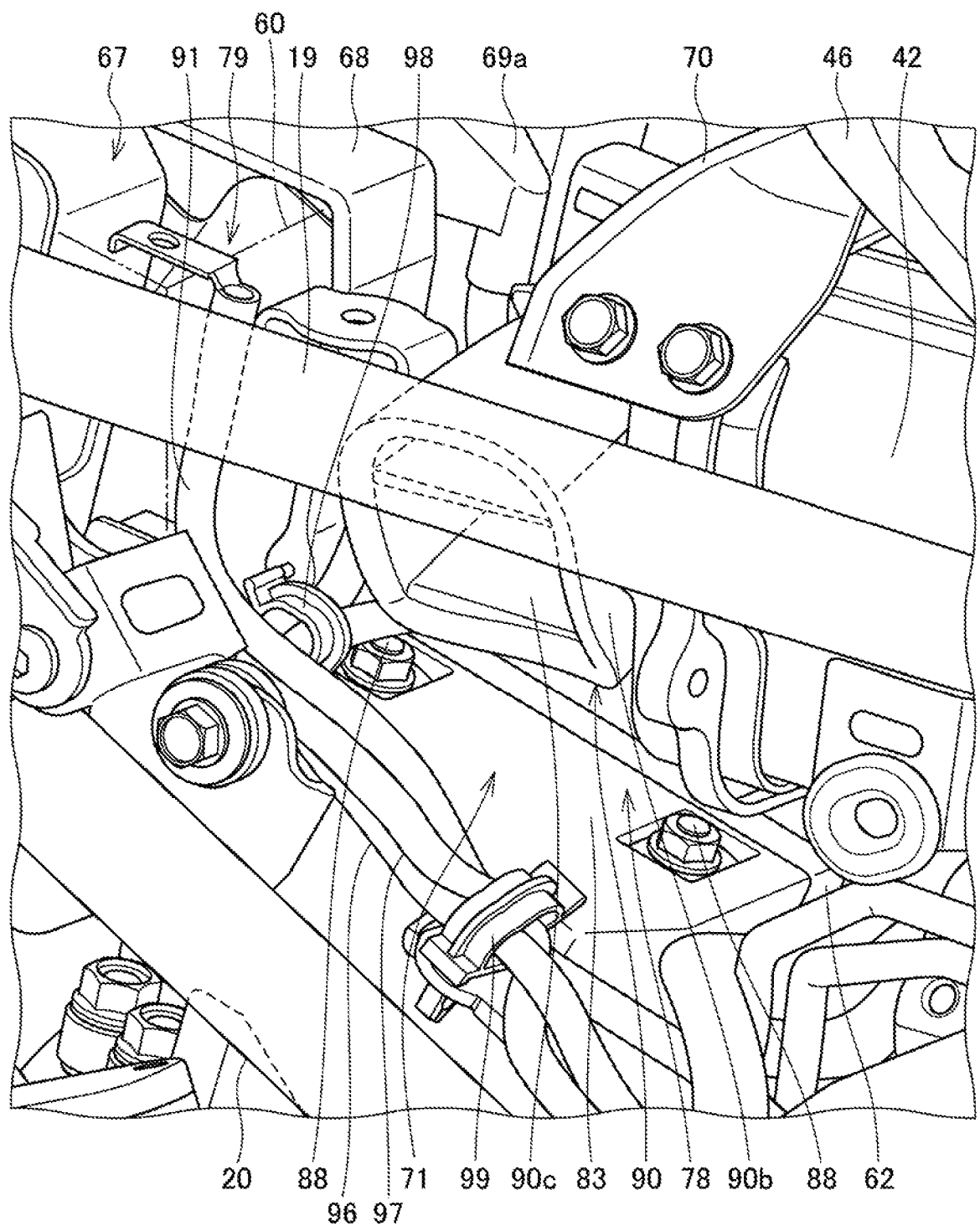
FIG. 11 is a perspective view of an intake duct, a regulator storing portion, and a portion around the intake duct and the regulator storing portion as viewed from a right side.

FIG. 11 is a perspective view of the intake duct 90, the regulator storing portion 78, and a portion around the intake duct 90 and the regulator storing portion 78 as viewed from a right side.

As shown in FIG. 11, an intake port 90c provided on an outer end of the sideward extending portion 90b of the intake duct 90 opens toward the space portion 71 on a right side of a center portion side of a vehicle width.

The plurality of harnesses 96, 97 and the wire 91 of the electric system are disposed in the vicinity of the intake port 90c.

To describe in more detail, the harnesses 96, 97 and the wire 91 are wired in an extending manner in a longitudinal direction of the vehicle between the intake port 90c and the seat rail 19 and the sub frame 20 on a right side in a vehicle width direction.

A plurality of harness fixing jigs 98, 99 for fixing the harnesses 96, 97 to a vehicle body side are provided in the vicinity of the intake port 90c.

The harness fixing jigs 98, 99 are formed into an annular clip shape, and are bundled into one piece such that the harness fixing jigs 98, 99 surround the harnesses 96, 97 from an outer periphery of the harnesses 96, 97.

The harness fixing jigs 98, 99 are provided which are arranged so as to sandwich the intake port 90c in a longitudinal direction of the vehicle.

The harness fixing jigs 98, 99 are engaged above the first bottom wall portion 83 of the regulator storing portion 78 so as to fix the harnesses 96, 97 to the first bottom wall portion 83. With such a configuration, fluttering of the harnesses 96, 97 in the vicinity of the intake port 90c can be prevented thus maintaining favorable suction efficiency. Further, the harnesses 96, 97 are fixed below the intake port 90c and hence, it is possible to prevent the harnesses 96, 97 from interrupting the intake port 90c thus enhancing intake efficiency.

The harnesses 96, 97 and the wire 91 may be formed into a bundle by the harness fixing jigs 98, 99.

As has been described heretofore, according to the embodiment to which the present invention is applied, the motorcycle 1 includes: the pair of left and right seat rails 19, 19 disposed below the seat 14 for a passenger; the battery 60 disposed below the seat 14; and the regulator 62 connected to the battery 60. When viewed from above, the battery 60 and the regulator 62 are arranged in a longitudinal direction between the left and right seat rails 19, 19. The regulator 62 and the battery 60 are disposed such that the regulator 62 is disposed below the upper surface 60a of the battery 60 thus forming the stepped portion 92. The intake duct 90 of the intake device 41 is disposed in the space formed above the regulator 62 by the stepped portion 92.

With such a configuration, the battery 60 and the regulator 62 are arranged in a longitudinally aligned state between the left and right seat rails 19, 19 and hence, the battery 60 and the regulator 62 can be disposed in a compact manner below the seat 14. In the arrangement of the battery 60 and the regulator 62, by making use of the space above the regulator 62 formed by the stepped portion 92, the intake duct 90 can be disposed in a compact manner below the seat 14. Further, since the battery 60 and the regulator 62 can be disposed adjacently to each other in a longitudinal direction of the vehicle, the regulator 62 can be easily connected to the battery 60.

The ABS module 64 of the braking devices 63 for the front wheel 2 and the rear wheel 3 is disposed below the regulator 62. With such a configuration, the ABS module 64 can be disposed in a compact manner, and the concentration of a mass can be realized by arranging the ABS module 64 in the vicinity of the battery 60.

The motorcycle 1 also includes the cushion unit 31 suspended between the swing arm 13 which supports the rear wheel 3 and the body frame 10, and the ABS module 64 is disposed behind the cushion unit 31. With such a configuration, the ABS module 64 can be disposed in a compact manner by making use of the space behind the cushion unit 31.

The ABS module 64 is disposed in an offset manner in a vehicle width direction with respect to the cushion unit 31. With such a configuration, it is possible to prevent the ABS module 64 from obstructing an access of a passenger to the cushion unit 31 and hence, the adjustment and maintenance of the cushion unit 31 can be easily performed.

The motorcycle 1 also includes the electric component storing box 67 which stores the battery 60 and the regulator 62, and a lower surface of the regulator 62 is exposed below the electric component storing box 67. With such a configuration, the battery 60 and the regulator 62 can be protected by the electric component storing box 67, and the regulator 62 can be efficiently cooled by way of a portion of the regulator 62 which is exposed below the electric component storing box 67.

With respect to the regulator 62, the fins 62b are disposed below the electric component storing box 67 in an exposed manner, and the wire connecting portion 62a is covered by the electric component storing box 67 from below. With such a configuration, the regulator 62 can be efficiently cooled by way of the fins 62b, and the wire connecting portion 62a can be effectively protected by the electric component storing box 67.

The electric component storing box 67 is integrally formed with the front end portion of the rear fender 55. With such a configuration, the number of parts can be reduced so that the structure can be simplified.

According to the embodiment to which the present invention is applied, the motorcycle 1 includes: the pair of left and right seat rails 19, 19 disposed below the seat 14 for a passenger; the battery 60 disposed below the seat 14; and the ECU 61 for controlling the engine 11 of the motorcycle 1, wherein when viewed from above, the battery 60 and the ECU 61 are arranged side by side in a vehicle width direction between the left and right seat rails 19, 19.

With such a configuration, the battery 60 and the ECU 61 are arranged side by side in the vehicle width direction between the left and right seat rails 19, 19 and hence, the battery 60 and the ECU 61 can be disposed below the seat 14 in a compact manner in a longitudinal direction of the vehicle.

The main harness 69 of the electric system is wired in a longitudinal direction of the vehicle between the battery 60 and the ECU 61. With such a configuration, the main harness 69 can be disposed in a compact manner by making use of a space between the battery 60 and the ECU 61. Further, the main harness 69 is wired in a longitudinal direction of the vehicle and hence, wiring efficiency of the main harness 69 is enhanced.

The upper surface 60a of the battery 60 and the upper surface 61b of the ECU 61 are formed substantially flush with each other. With such a configuration, other components can be easily disposed above the battery 60 and the ECU 61.

The motorcycle 1 further includes: the pair of left and right pivot frames 18, 18 supporting the swing arm 13 which supports the rear wheel 3; and the pair of left and right sub frames 20, 20 extending rearwardly and upwardly from the left and right pivot frames 18, 18 and connected to the left and right seat rails 19, 19, wherein as viewed in the side view of the vehicle, the space portions 71, 71 surrounded by the pivot frames 18, 18, the seat rails 19, 19, and the sub frames 20, 20 are formed, and the starter magnet switch 72 and the relay 73 are disposed in the space portion 71 on a side where the ECU 61 is disposed in a lateral direction of the vehicle as electric components. With such a configuration, a passenger can easily get access to the starter magnet switch 72 and the relay 73 through the space portion 71, and the starter magnet switch 72 and the relay 73 can be effectively protected by the pivot frames 18, the seat rails 19, and the sub frames 20. Further, the starter magnet switch 72 and the relay 73 are disposed close to the ECU 61 and hence, the starter magnet switch 72 and the relay 73 can be easily connected to the ECU 61.

The motorcycle 1 further includes the electric component storing box 67 in which the battery 60 and the ECU 61 are provided, wherein the electric component storing box 67 has the partition wall 80 between the battery 60 and the ECU 61, and the main harness 69 is disposed above the partition wall 80 between the battery 60 and the ECU 61. With such a configuration, the battery 60 and the ECU 61 can be protected by the electric component storing box 67. Further, the ECU 61 and the battery 60 can be disposed in a suitably separated manner by the partition wall 80, and a vertical position of the main harness 69 can be restricted by the partition wall 80. In this embodiment, the partition wall 80 is provided with a height smaller than heights of the battery 60 and the ECU 61.

The intake duct 90 of the intake device 41 is disposed above the electric component storing box 67 and in front of the battery 60. With such a configuration, the intake duct 90 can be protected by the electric component storing box 67, and the intake duct 90 can be disposed in a compact manner by making use of the space in front of the battery 60.

The battery 60 is disposed vertically such that the plus terminal portion 60p and the minus terminal portion 60n are positioned on the upper surface 60a of the battery 60, and the battery 60 is disposed in a direction that the plus terminal portion 60p is disposed closer to the main harness 69 than the minus terminal portion 60n. With such a configuration, the plus terminal portion 60p can be easily connected to the main harness 69.

The above-mentioned embodiment describes one mode to which the aspect of the present invention is applied, and the aspect of the present invention is not limited to the above-mentioned embodiment.

In the above-mentioned embodiment, a portion of the lower surface of the regulator 62 is exposed below the electric component storing box 67. However, the aspect of the present invention is not limited to such a configuration. It is sufficient that at least a portion of the regulator 62 is exposed below the electric component storing box 67. For example, the whole lower surface of the regulator 62 may be exposed below the electric component storing box 67.

In the above-mentioned embodiment, the description has been made by taking the motorcycle 1 as an example of a saddle riding vehicle. However, the aspect of the present invention is not limited to the motorcycle 1. The aspect of the present invention is also applicable to a three-wheeled saddle riding vehicle provided with two front wheels or two rear wheels, a saddle riding vehicle provided with four or more wheels and the like.

REFERENCE SIGNS LIST

1: motorcycle (saddle riding vehicle)
3: rear wheel (wheel)
11: engine (drive source)
13: swing arm
14: seat
18, 18: pivot frame
19, 19: seat rail
20, 20: sub frame
41: intake device
55: rear fender
60: battery
60a: upper surface (upper surface of battery)
60n: minus terminal portion
60p: plus terminal portion
61: electronic control unit (ECU)
61b: upper surface (upper surface of electronic control unit)
67: electric component storing box
69: main harness
71: space portion
72: starter magnet switch (electric component)
73: relay (electric component)
80: partition wall
90: intake duct

The invention claimed is:
1. A saddle riding vehicle comprising:
a pair of left and right seat rails disposed below a seat for a passenger;
a battery disposed below the seat; and
an electronic control unit for controlling a drive source of the vehicle, wherein, when viewed from above, the battery and the electronic control unit are arranged side by side in a vehicle width direction between the left and right seat rails, wherein a main harness of an electric system is wired between the battery and the electronic control unit, and the main harness includes a longitudinal extending portion wired in a longitudinal direction of the vehicle through a gap formed between the battery and the electronic control unit.

2. The saddle riding vehicle according to claim 1, wherein the battery is disposed vertically such that a plus terminal portion and a minus terminal portion are positioned on an upper surface of the battery, and the battery is disposed in a direction that the plus terminal portion is disposed closer to the main harness than the minus terminal portion.

3. The saddle riding vehicle according to claim 1, wherein an upper surface of the battery and an upper surface of the electronic control unit are formed flush with each other.

4. The saddle riding vehicle according to claim 1 further comprising:

a pair of left and right pivot frames supporting a swing arm which supports a rear wheel; and a pair of left and right sub frames extending rearwardly and upwardly from the left and right pivot frames, the pair of left and right sub frames being connected to the left and right seat rails, wherein, as viewed in the side view of the vehicle, a space portion surrounded by the pivot frames, the seat rails, and the sub frames is formed, and an electric component is disposed in the space portion on a side where the electronic control unit is disposed in a lateral direction of the vehicle.

5. The saddle riding vehicle according to claim 1, further comprising an electric component storing box in which the battery and the electronic control unit are provided, wherein the electric component storing box has a partition wall between the battery and the electronic control unit, and the main harness is disposed above the partition wall between the battery and the electronic control unit.

6. The saddle riding vehicle according to claim 5, wherein the electric component storing box is integrally formed with a front end portion of a rear fender.

7. The saddle riding vehicle according to claim 5, wherein an intake duct of an intake device is disposed above the electric component storing box and in front of the battery.

8. A saddle riding vehicle comprising:

a pair of left and right seat rails disposed below a seat for a passenger;

a battery disposed below the seat; and an electronic control unit for controlling a drive source of the vehicle, wherein, when viewed from above, the battery and the electronic control unit are arranged side by side in a vehicle width direction between the left and right seat rails, and an upper surface of the battery and an upper surface of the electronic control unit are formed flush with each other.

9. A saddle riding vehicle comprising:

a pair of left and right seat rails disposed below a seat for a passenger;

a battery disposed below the seat; and an electronic control unit for controlling a drive source of the vehicle, wherein, when viewed from above, the battery and the electronic control unit are arranged side by side in a vehicle width direction between the left and right seat rails, the saddle riding vehicle further comprises:

a pair of left and right pivot frames supporting a swing arm which supports a rear wheel; and a pair of left and right sub frames extending rearwardly and upwardly from the left and right pivot frames, the pair of left and right sub frames being connected to the left and right seat rails, wherein, as viewed in the side view of the vehicle, a space portion surrounded by the pivot frames, the seat rails, and the sub frames is formed, and an electric component is disposed in the space portion on a side where the electronic control unit is disposed in a lateral direction of the vehicle.

* * * * *